US012549546B2

(12) United States Patent
Meisner et al.

(10) Patent No.: US 12,549,546 B2
(45) Date of Patent: Feb. 10, 2026

(54) SYSTEM AND METHOD TO PROVIDE ENTERPRISE AUTHORIZATION MANAGEMENT TOOL

(71) Applicant: HARTFORD FIRE INSURANCE COMPANY, Hartford, CT (US)

(72) Inventors: Shane A Meisner, New Richmond, WI (US); Robert C. Rising, Manchester, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 150 days.

(21) Appl. No.: 18/335,311

(22) Filed: Jun. 15, 2023

(65) Prior Publication Data

US 2024/0422156 A1    Dec. 19, 2024

(51) Int. Cl.
H04L 9/40 (2022.01)

(52) U.S. Cl.
CPC ........ H04L 63/0876 (2013.01); H04L 63/102 (2013.01)

(58) Field of Classification Search
CPC ................ H04L 63/0876; H04L 63/102
See application file for complete search history.

(56) References Cited

U.S. PATENT DOCUMENTS

| | | | |
|---|---|---|---|
| 5,742,757 A | 4/1998 | Hamadani et al. | |
| 6,810,389 B1 | 10/2004 | Meyer | |
| 6,816,842 B1 * | 11/2004 | Singh | G06F 21/105 |
| | | | 705/59 |
| 7,603,318 B1 | 10/2009 | Colosso et al. | |
| 7,703,142 B1 * | 4/2010 | Wilson | H04W 12/084 |
| | | | 713/168 |
| 8,578,366 B2 * | 11/2013 | Ricci | G06Q 10/06 |
| | | | 717/173 |
| 9,779,445 B1 * | 10/2017 | Hoberman | G06F 21/10 |
| 11,620,363 B1 * | 4/2023 | Woodward | H04L 9/30 |
| | | | 726/26 |
| 2002/0107809 A1 * | 8/2002 | Biddle | G06Q 30/06 |
| | | | 705/59 |

(Continued)

*Primary Examiner* — Mohamed A. Wasel
(74) *Attorney, Agent, or Firm* — Buckley, Maschoff & Talwalkar LLC

(57) ABSTRACT

Embodiments may be associated with an enterprise cloud-based computing environment. A computer processor of an enterprise authorization management tool may receive, from a user device, a request for third-party authorization to utilize functionality associated with the cloud-based computing environment (e.g., a software license). Based on the received request, the enterprise authorization management tool may determine if the request is approved. If the request is approved, the enterprise authorization management tool may automatically transmit information to a third-party authorization assignment platform. Upon confirmation from the authorization assignment platform, the enterprise authorization management tool may transmit a notification to the user device indicating that third-party authorization has been obtained. The third-party authorization assignment platform may, according to some embodiments, automatically arrange to obtain authorization for the requested functionality from the third-party.

18 Claims, 15 Drawing Sheets

(56) References Cited

U.S. PATENT DOCUMENTS

| | | | |
|---|---|---|---|
| 2008/0005787 A1* | 1/2008 | Aldred | G06F 21/105 |
| | | | 717/172 |
| 2008/0235141 A1 | 9/2008 | Hilerio et al. | |
| 2008/0243699 A1 | 10/2008 | Hilerio et al. | |
| 2013/0262265 A1* | 10/2013 | Song | G06Q 20/127 |
| | | | 726/28 |
| 2015/0281322 A1* | 10/2015 | Dingwell | G06F 9/54 |
| | | | 715/740 |
| 2020/0371766 A1* | 11/2020 | Sousa | H04L 63/083 |
| 2023/0054904 A1 | 2/2023 | Crowley et al. | |
| 2023/0281278 A1* | 9/2023 | Fernandez Garcia | |
| | | | G06F 21/105 |
| | | | 705/59 |

* cited by examiner

SYSTEM AND METHOD TO PROVIDE ENTERPRISE AUTHORIZATION MANAGEMENT TOOL

TECHNICAL FIELD

The present application generally relates to computer systems and more particularly to computer systems that are adapted to accurately, securely, and/or automatically distribute and/or assign authorizations for an enterprise.

BACKGROUND

An enterprise may utilize a cloud-based computing environment to implement organizational functionality. For example, an enterprise may utilize third-party software packages to process financial information, handle sales orders from customers, perform Human Resources ("HR") tasks, etc. In some cases, the enterprise may need to perform certain steps to utilize certain software features or functions. For example, the enterprise may need to purchase a new license (or upgrade an existing license) on a per-user basis to access a specific ability of the software. To reduce costs, the enterprise may review requests to use such features on a case-by-case basis (e.g., to ensure that the cost is justified). Manually reviewing and managing such purchases can be a time consuming and inefficient process-especially when a substantial number of users and/or software packages are involved. It would therefore be desirable to provide improved systems and methods to accurately and/or automatically provide an enterprise authorization management tool for an enterprise. Moreover, the tool should be easy to access, understand, interpret, update, etc.

SUMMARY OF THE INVENTION

According to some embodiments, systems, methods, apparatus, computer program code and means are provided to accurately and/or automatically provide an enterprise authorization management tool for an enterprise with a fast, secure, and useful process. Moreover, embodiments may allow for flexibility and effectiveness when managing software licenses.

Some embodiments are directed to an enterprise cloud-based computing environment. A computer processor of an enterprise authorization management tool may receive, from a user device, a request for third-party authorization to utilize functionality associated with the cloud-based computing environment (e.g., a software license). Based on the received request, the enterprise authorization management tool may determine if the request is approved. If the request is approved, the enterprise authorization management tool may automatically transmit information to a third-party authorization assignment platform. Upon confirmation from the authorization assignment platform, the enterprise authorization management tool may transmit a notification to the user device indicating that third-party authorization has been obtained. The third-party authorization assignment platform may, according to some embodiments, automatically arrange to obtain authorization for the requested functionality from the third-party.

Some embodiments comprise: means for receiving, at a computer processor of an enterprise authorization management tool from a user device, a request for authorization to utilize functionality associated with the cloud-based computing environment; based on the received request, means for determining if the request is approved; if the request is approved, means for automatically transmitting information to a third-party authorization assignment platform; and upon confirmation from the authorization assignment platform, means for transmitting a notification to the user device to indicate that third-party authorization has been obtained.

In some embodiments, a communication device associated with an enterprise authorization management tool exchanges information with remote devices in connection with interactive graphical user interfaces. The information may be exchanged, for example, via public and/or proprietary communication networks.

A technical effect of some embodiments of the invention is improved and computerized authorization management for an enterprise in a way that provides a fast, secure, and useful process. With these and other advantages and features that will become hereinafter apparent, a more complete understanding of the nature of the invention can be obtained by referring to the following detailed description and to the drawings appended hereto.

DETAILED DESCRIPTION

Figure 1:
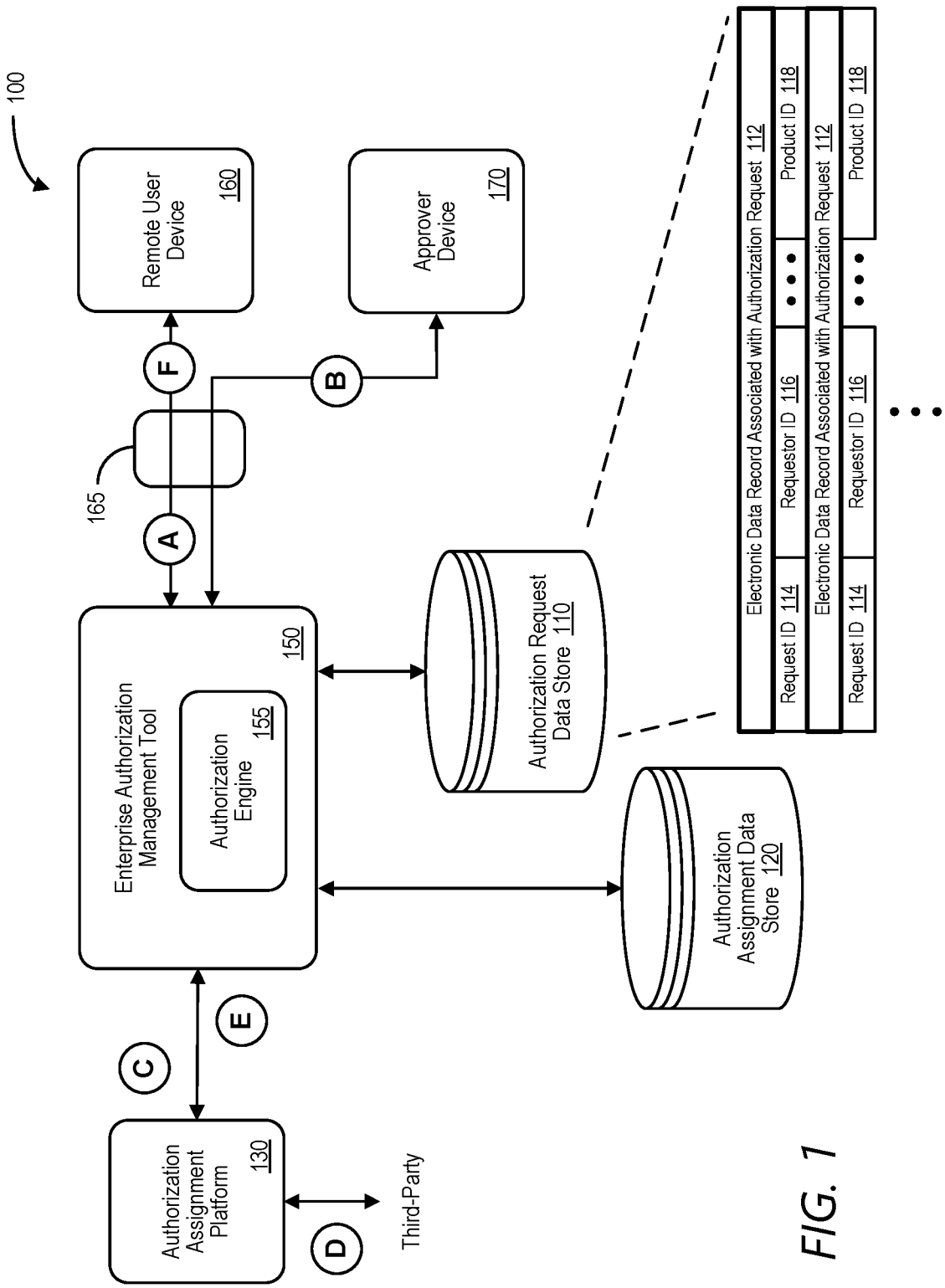
FIG. 1 is a high-level block diagram of a system in accordance with some embodiments.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data processing associated with authorization management. The present invention is directed to more than merely a computer implementation of a routine or conventional activity previously known in the industry as it provides a specific advancement in the area of electronic record analysis by providing improvements in the operation of a computer system that customizes authorization management (including those associated with automated cloud-based software authorization processing). The present invention provides improvement beyond a mere generic computer implementation as it involves the novel ordered combination of system elements and processes to provide improvements in the speed, security, and accuracy of such an authorization management tool for an enterprise. Some embodiments of the present invention are directed to a system adapted to automatically customize and execute authorization management, aggregate data from multiple data sources, and/or automatically track license authorization information to reduce unnecessary messages or communications, etc. (e.g., to consolidate and/or search authorization data). Moreover, communication links and messages may be automatically established, aggregated, formatted, modified, removed, exchanged, etc. to improve network performance (e.g., by reducing an amount of network messaging bandwidth and/or storage required to create authorization management messages or alerts, improve security, reduce the size of an authorization request data store, etc.).

FIG. 1 is a high-level block diagram of an authorization management system 100 that may be provided according to some embodiments of the present invention. In particular, the system 100 includes an enterprise authorization management tool 150 that may access information in an authorization request data store 110 (e.g., storing a set of electronic records associated with various authorization requests 112, each record including, for example, one or more authorization request identifiers 114, requestor identifiers 116, product identifiers 118, etc.). The enterprise authorization management tool 150 may also store information into other data stores, such as an authorization assignment data store 120, and utilize authorization engine 155 to exchange and process messages (e.g., daily/weekly data runs or on-demand changes) and view, analyze, and/or update the electronic records. The enterprise authorization management tool 150 may also exchange information with a remote user device 160 and approver device 170 (e.g., via a firewall 165). According to some embodiments, an interactive graphical user interface platform of the enterprise authorization management tool 150 may facilitate authorization management, recommendations, alerts, and/or the display of results via one or more remote administrator computers (e.g., to summarize system 100 performance) and/or the devices 160, 170. For example, the approver device 170 may transmit annotated and/or updated information to the enterprise authorization management tool 150. Based on the updated information, the enterprise authorization management tool 150 may adjust data in the authorization request data store 110 and/or the authorization assignment data store 120 and the change may (or may not) be used in connection with the remote user device 160. Note that the enterprise authorization management tool 150 and/or any of the other devices and methods described herein might be associated with a third-party, such as a vendor that performs a service for an enterprise.

In some cases, enterprise authorization tool 150 may exchange information with an authorization assignment platform 130. For example, the authorization assignment platform might interact with a third-party to obtain a new or upgraded software license.

The enterprise authorization management tool 150 and/or the other elements of the system 100 might be, for example, associated with a Personal Computer ("PC"), laptop computer, smartphone, an enterprise server, a server farm, and/or a database or similar storage devices. According to some embodiments, an "automated" enterprise authorization management tool 150 (and/or other elements of the system 100) may facilitate the automated access and/or update of electronic records in the data stores 110, 120 and/or the management of an authorization request. As used herein, the term "automated" may refer to, for example, actions that can be performed with little (or no) intervention by a human.

Devices, including those associated with the enterprise authorization management tool 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The enterprise authorization management tool 150 may store information into and/or retrieve information from the authorization request data store 110 and/or the authorization assignment data store 120. The data stores 110, 120 may be locally stored or reside remote from the enterprise authorization management tool 150. As will be described further below, the authorization request data store 110 may be used by the enterprise authorization management tool 150 in connection with an interactive user interface to access and update electronic records. Although a single enterprise authorization management tool 150 is shown in FIG. 1, any number of such devices may be included. Moreover, various devices described herein might be combined according to embodiments of the present invention. For example, in some embodiments, the enterprise authorization management tool 150 and authorization request data store 110 might be co-located and/or may comprise a single apparatus.

Consider, for example, a user who submits a request to access certain software functionality at (A). At (B), the enterprise authorization management tool 150 may automatically transmit information about that request to the approver device 170. If the request is approved, the enterprise authorization management tool 150 may use the authorization assignment platform 130 at (C) to arrange for the functionality to be made available at (D). Once available at (E), a notification may be transmitted to the remote user device 160 at (F) to inform them that the function is now available.

Figure 2:
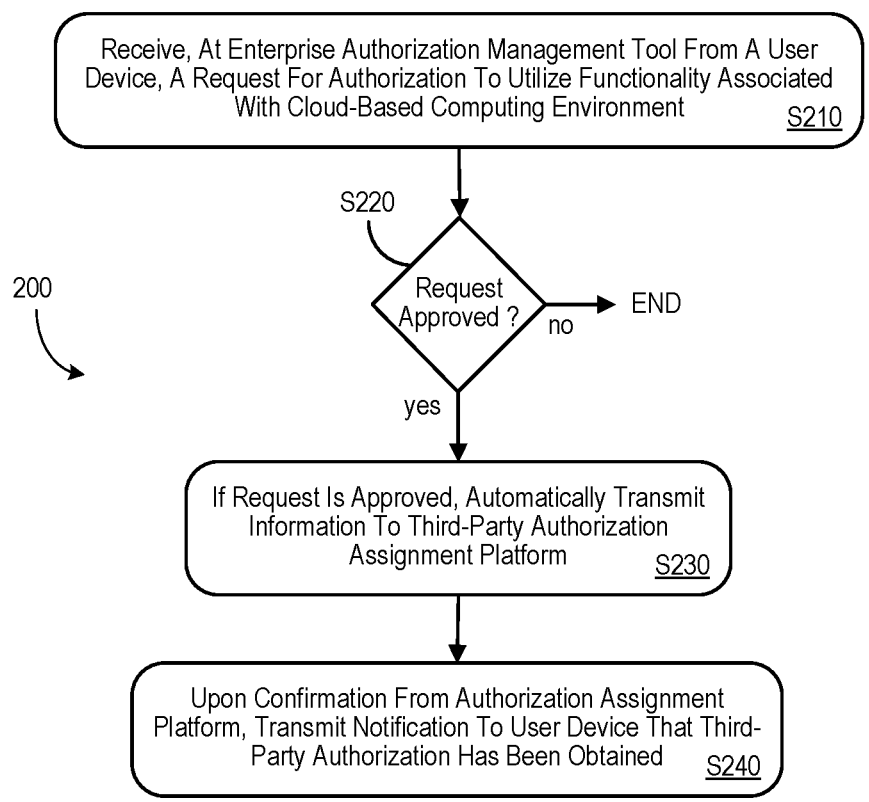
FIG. 2 illustrates a high-level method according to some embodiments.

The elements of the system 100 may work together to perform the various embodiments of the present invention. Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a computer processor of an enterprise authorization management tool may receive, from a user device, a request for authorization to utilize functionality associated with the cloud-based computing environment. The functionality associated with the cloud-based computing environment might be associated, for example, a Software-as-a-Service ("SaaS") and/or an automation platform premium connection (e.g., for MICROSOFT™ POWER PLATFORM®). Note that the functionality might be associated with a cloud application or an on-premises application. According to some embodiments, the received request may include an enterprise justification (e.g., explaining why the functionality is needed), a desired outcome, an impact, an account identifier (e.g., of the user requesting authorization), a product identifier (e.g., identifying a particular software program or package), etc. In some cases, the request for third-party authorization to utilize functionality is associated with a software license from the third-party. Moreover, the enterprise authorization management tool may associated with an automation platform (e.g., MICROSOFT™ POWER PLATFORM®), such as one that utilizes a web-based collaborative platform list (e.g., a MICROSOFT™ SHAREPOINT® list).

Based on the received request, the system may determine if the request is approved at S220. If the request is not approved, the process ends. For example, a manager or supervisor may review the request and determine if a license purchase is justified. According to some embodiments, the determination of whether the request is approved at S220 utilizes an automated process associated with business rules, enterprise logic, machine learning, etc.

If the request is approved, at S230 the system may automatically transmit information to a third-party authorization assignment platform. The third-party authorization assignment platform may, for example, automatically arrange to obtain authorization for the requested functionality from the third-party. According to some embodiments, the third-party authorization assignment platform is associated with a cloud computing platform (e.g., MICROSOFT™ AZURE® that provides access, management, and development of applications and services through a global data center. Moreover, such a cloud computing platform may utilize an active directory.

Upon confirmation from the authorization assignment platform, the system may transmit a notification to the user device indicating that third-party authorization has been obtained at S240. According to some embodiments, the system may further arrange to provide Data Loss Prevention ("DLP"), group ownership of authorizations, reconciliation of authorizations, disablement of authorizations (e.g., when a license is no longer required), etc. Moreover, the system might further provide a dashboard user interface to facilitate automated future license forecasting using POWER Business Intelligence ("BI") (e.g., how many licenses will be requested or purchased next quarter?).

Figure 3:
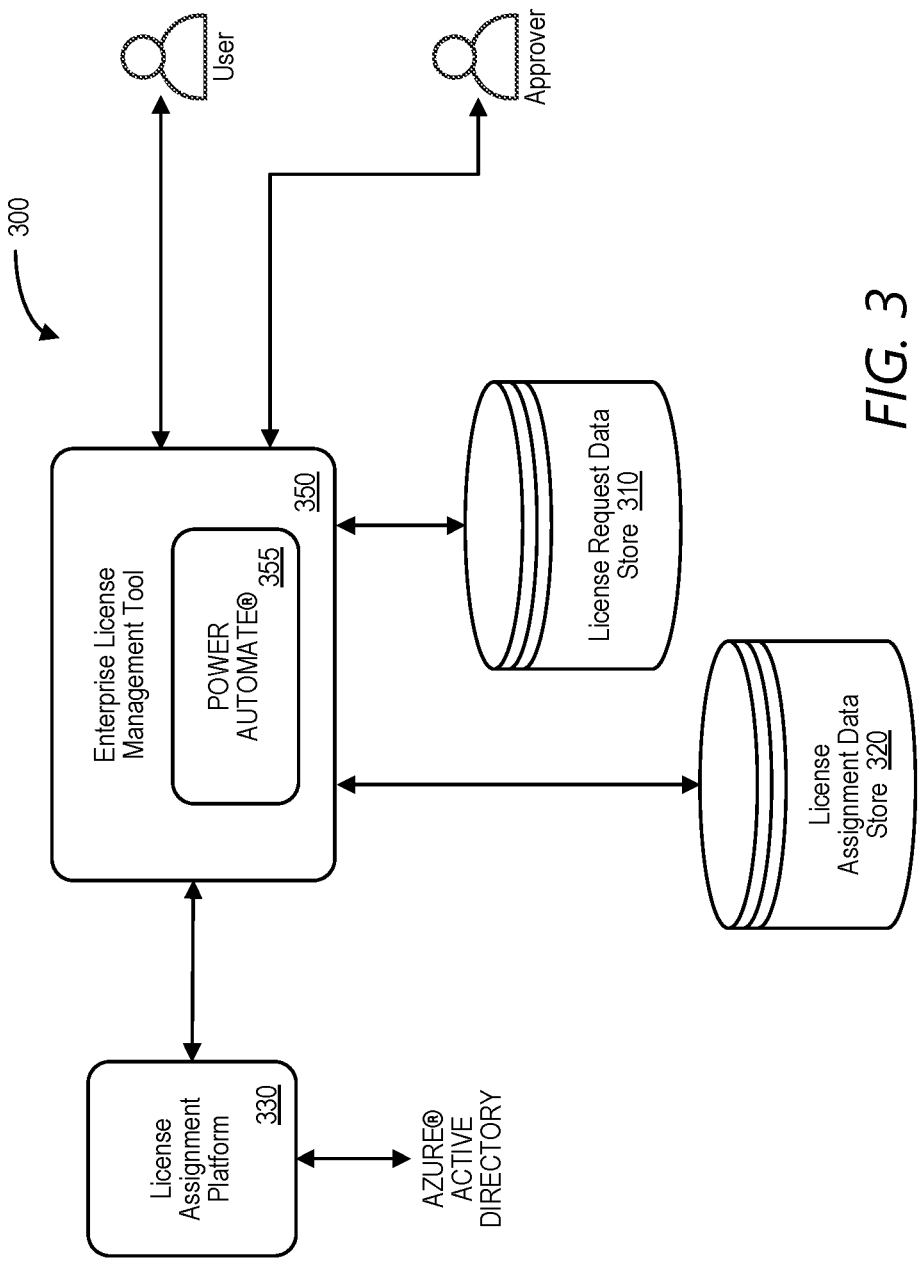
FIG. 3 is a more detailed system in accordance with some embodiments.

FIG. 3 is a more detailed system 300 in accordance with some embodiments. Here, a user may submit a request for a license (e.g., a premium license) to an enterprise license management tool 350. The enterprise license management tool 350 may utilize POWER AUTOMATE® 355, store information about the request in a license request data store 310, and communicate with an approver (e.g., via an automated email, calendar function, information card, TEAMS® chat, etc.) to determine if the request will be approved. If approved, the enterprise license management tool 350 may interact with a license assignment platform 330 to obtain the license from a third-party (e.g., via an AZURE® active directory). Once the license is obtained, a license assignment data store 320 may be updated and the enterprise license management tool 350 may inform the user that the new functionality is now available for use.

Figure 4:
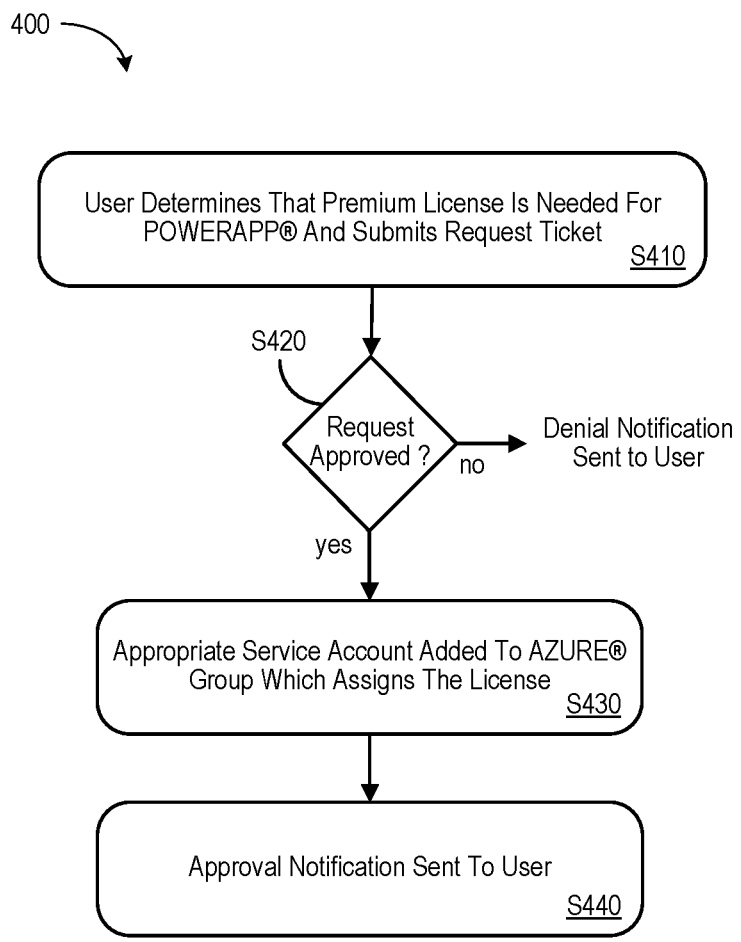
FIG. 4 is a process flow according to some embodiments.

FIG. 4 is a process flow 400 according to some embodiments. At S410, a user (e.g., an employee of an enterprise) determines that a premium license is needed for POWERAPP® and submits a request ticket. If the request is not approved at S420, a denial notification is sent to the user and the process ends. If the request is approved at S420, the appropriate service account is added to an AZURE® group which will assign the premium license as S430. At S440, an approval notification may be sent to the user indicating that the premium license is now available.

Figure 5:
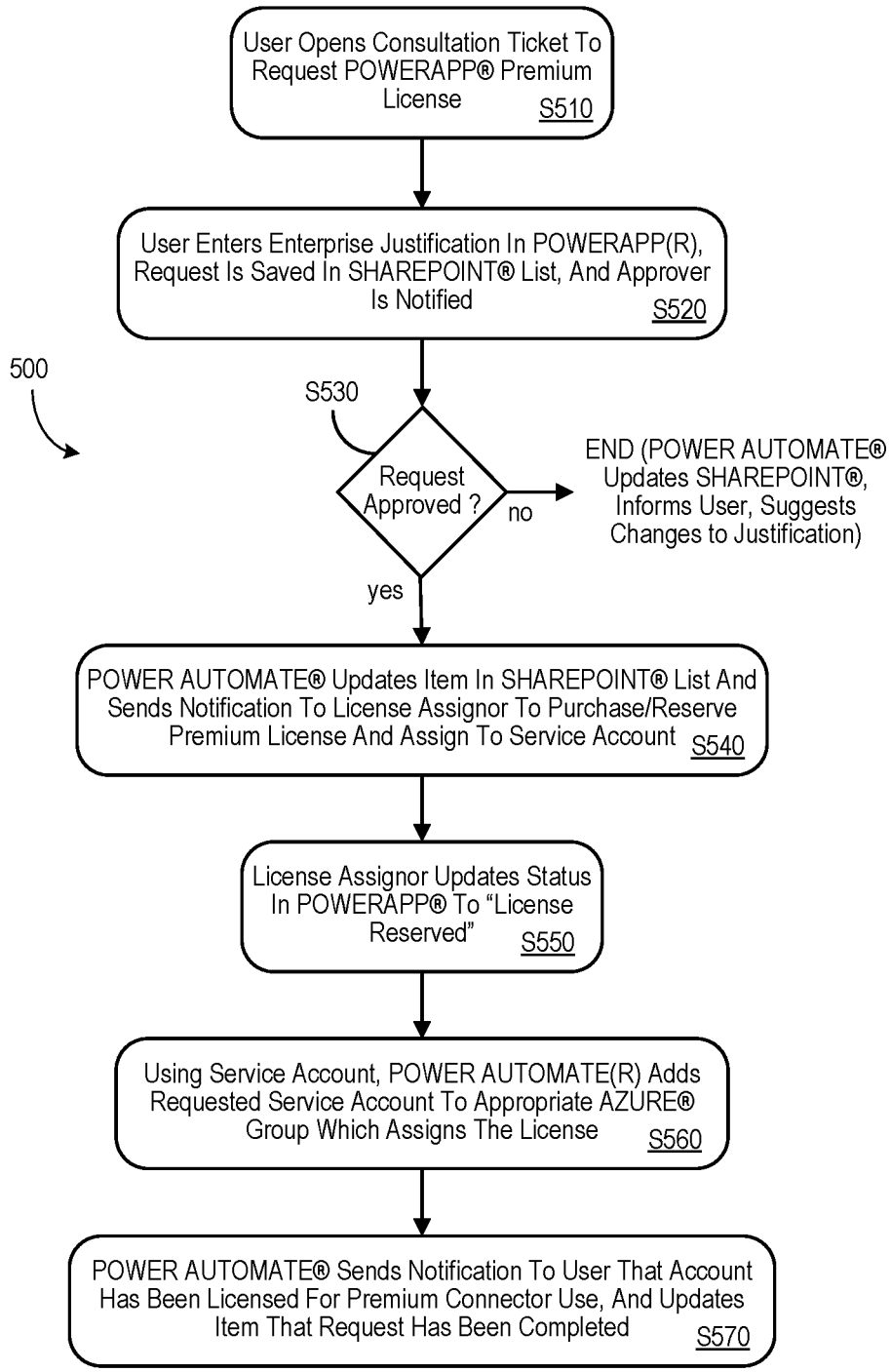
FIG. 5 is a more detailed process flow in accordance with some embodiments.

FIG. 5 is a more detailed process flow 500 in accordance with some embodiments. At S510, a user opens a consultation ticket to request a POWERAPP® Premium license (e.g., so that a power connector can be used). The user may then enter an enterprise justification (why is a power connector needed?), the request is saved in a SHAREPOINT® list, and an approver receives a notification about the request (e.g., the approver may be a manager, supervisor, group head, etc.) at S520. If the request is not approved at S530, the process ends. In this case, POWER AUTOMATE® may update SHAREPOINT®, inform the user, and, in some embodiments, suggest possible changes to an originally submitted justification.

If the request is approved at S530, POWER UPDATE® updates the item in the SHAREPOINT® list and sends a notification to a license assignor at S540 indicating that the assignor should purchase or reserve a premium license and assign it to the appropriate service account. At 550, the license assigner updates the status in POWERAPP® to "License Reserved." At 560, using the service account POWER AUTOMATE® adds the request service account to the appropriate AZURE® group which assigns the license. At S570, POWER AUTOMATE® sends a notification to the user that the account is now licensed for premium connector use and updates the item to indicate that the request has been completed.

Figure 6:
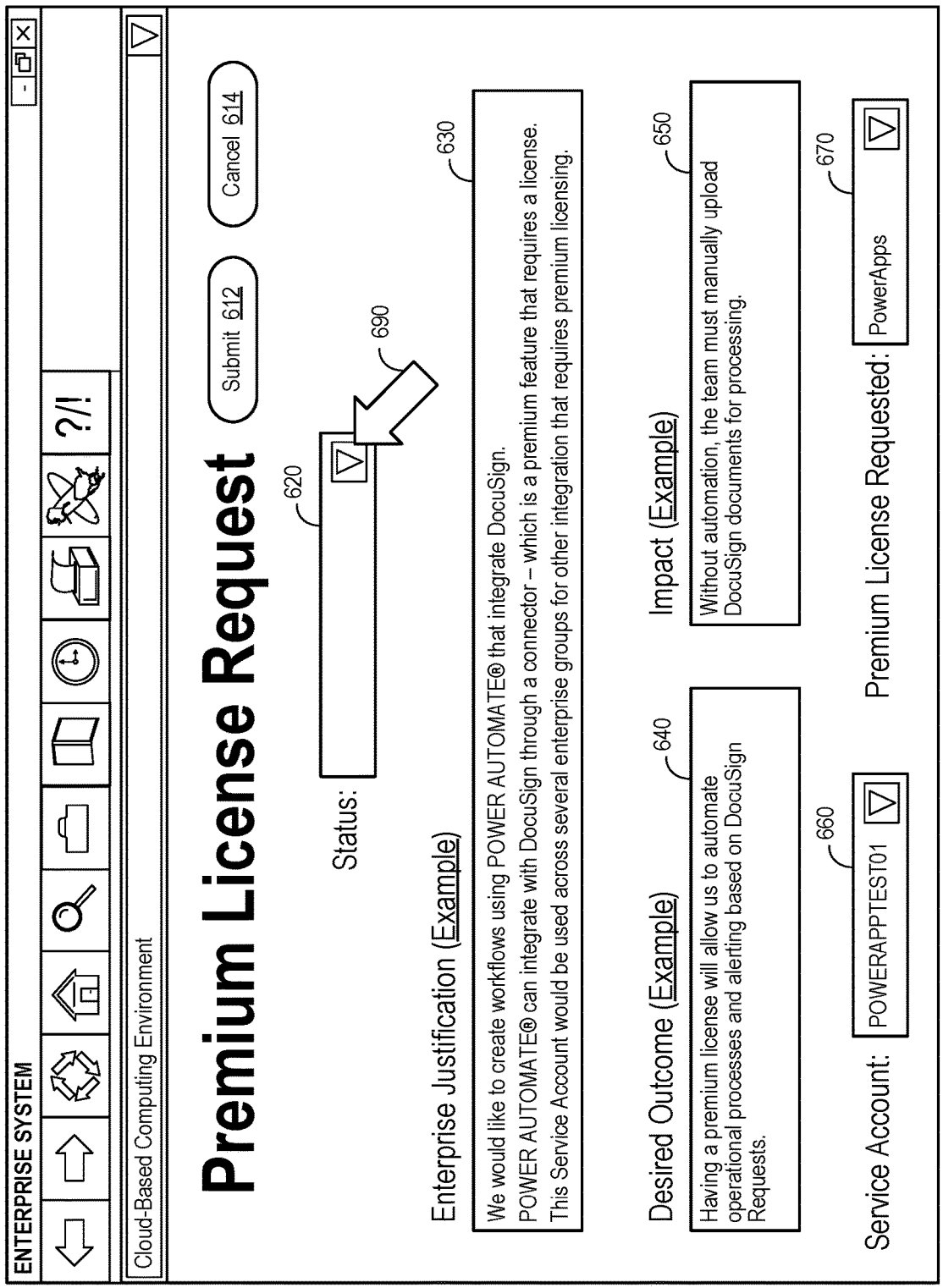
FIG. 6 is a license request display according to some embodiments.
Figure 7:
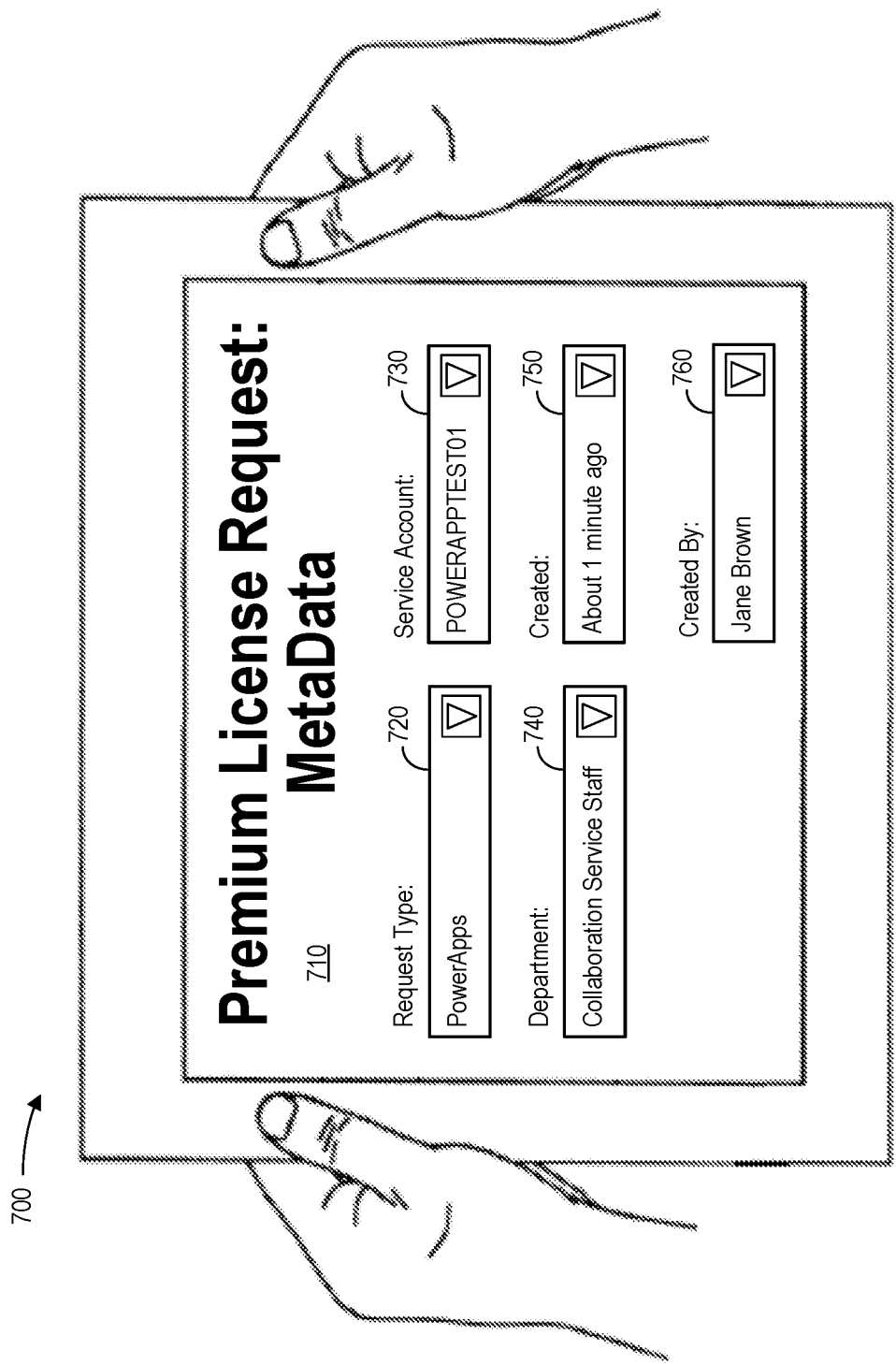
FIG. 7 is a tablet computer providing a metadata display in accordance with some embodiments.

FIGS. 6 through 12 are examples of enterprise displays that might be associated with a request for a premium license. In particular, FIG. 6 is a license request display 600 according to some embodiments. The display 600 might be used, for example, to submit 612 a new request or to cancel a request 614 before it is submitted. The display 600 includes a current status 620 of the request which may be selectable via a drop-down menu (e.g., via a touch screen or computer pointer 690). The user may enter an enterprise justification 630 to indicate how the license will be used, a desired outcome 640 to indicate how the license will benefit the enterprise, and an impact 650 the license will have on efficiency, productivity, etc. The user may also provide a service account 660 and indicate the particular license being requested 670 before selecting submit 612. According to some embodiments, metadata may be captured in a SHAREPOINT® list which includes what the service account request is for, who requested it, their department, and a date created for future reporting. For example, FIG. 7 is a tablet computer 700 providing a metadata display 710 including a request type 720, a service account 730, a department 740, a date created 750, and a creator name 760 in accordance with some embodiments.

Figure 8:
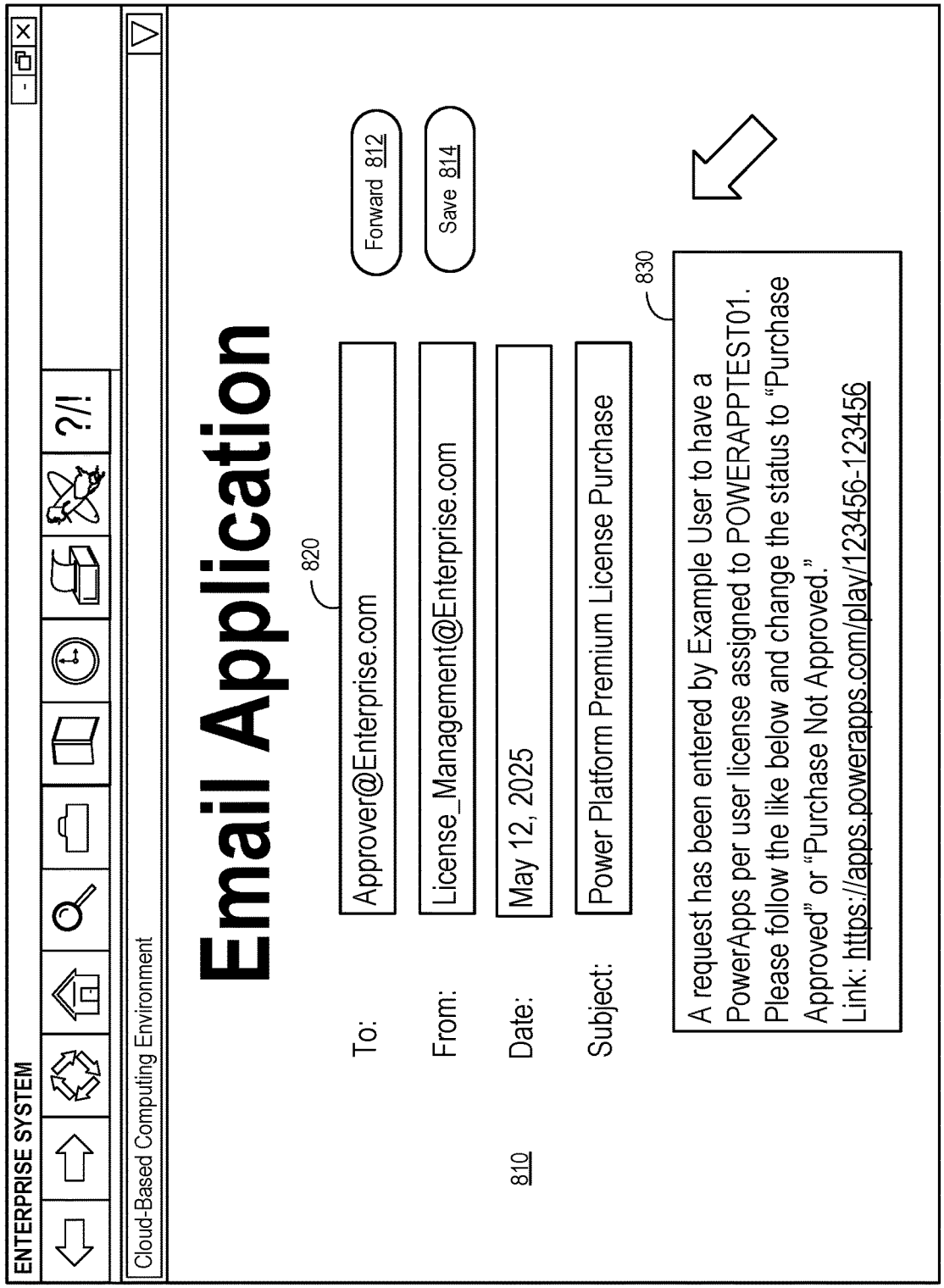
FIG. 8 is an automated email notification transmitted to an approver according to some embodiments.
Figure 9:
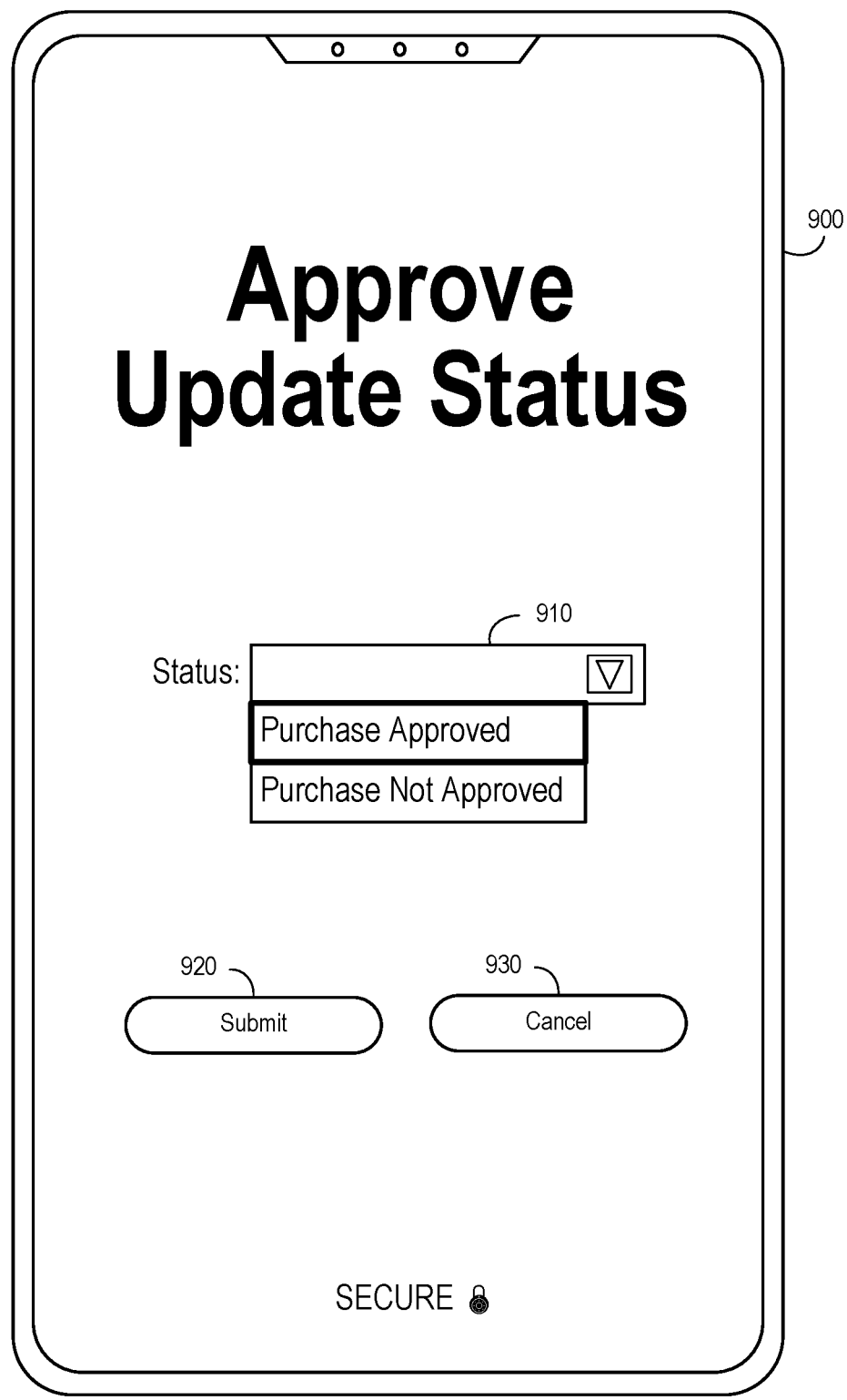
FIG. 9 is a smartphone providing a request status display in accordance with some embodiments.

When the request is received, an email may be automatically sent to an approver. For example, FIG. 8 is an automated email application display 800 showing an email notification 810 that may be transmitted to an approver according to some embodiments. The email notification 810 might be forwarded 812 to another party, saved 814, exported, etc. As indicated by a header 820, the email notification 810 is transmitted to the approver from an automated system with a subject indicating that a new license purchase has been requested. Moreover, a body 830 of the email notification 810 provides instructions with how the approver should respond along with a link associated with the original request. After the approver selects the link, a status of the request may be updated as appropriate. For example, FIG. 9 is a smartphone providing a request status display 900 in accordance with some embodiments. The display 900 may be used to update the status 910 of the request (e.g., to "Purchase Approved" or "Purchase Not Approved") before being submitted 920 or canceled 930.

Figure 10:
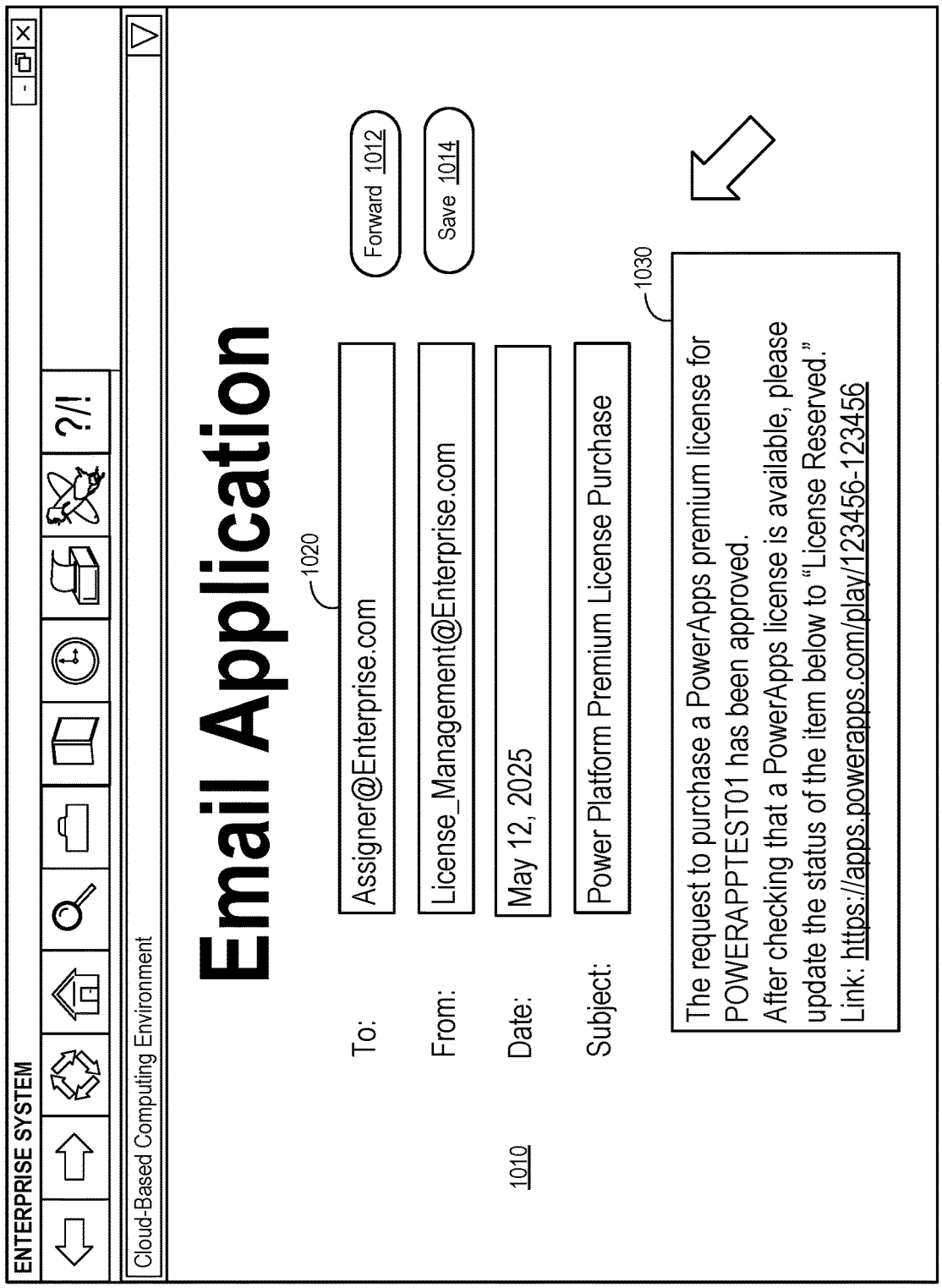
FIG. 10 is an automated email notification transmitted to an assigner according to some embodiments.

If the request is approved, an assignor may later update the status 910 to "License Reserved" as appropriate. For example, the FIG. 10 is an automated email application display 1000 showing an email notification 1010 that may be transmitted to an assigner according to some embodiments. The email notification 1010 might be forwarded 1012 to another party, saved 1014, exported, etc. As indicated by a header 1020, the email notification 1010 is transmitted to the assignor from the automated system with a subject indicating that a new license purchase has been approved. Moreover, a body 1030 of the email notification 1010 provides instructions with how the assignor should respond along with a link associated with the original request.

Figure 11:
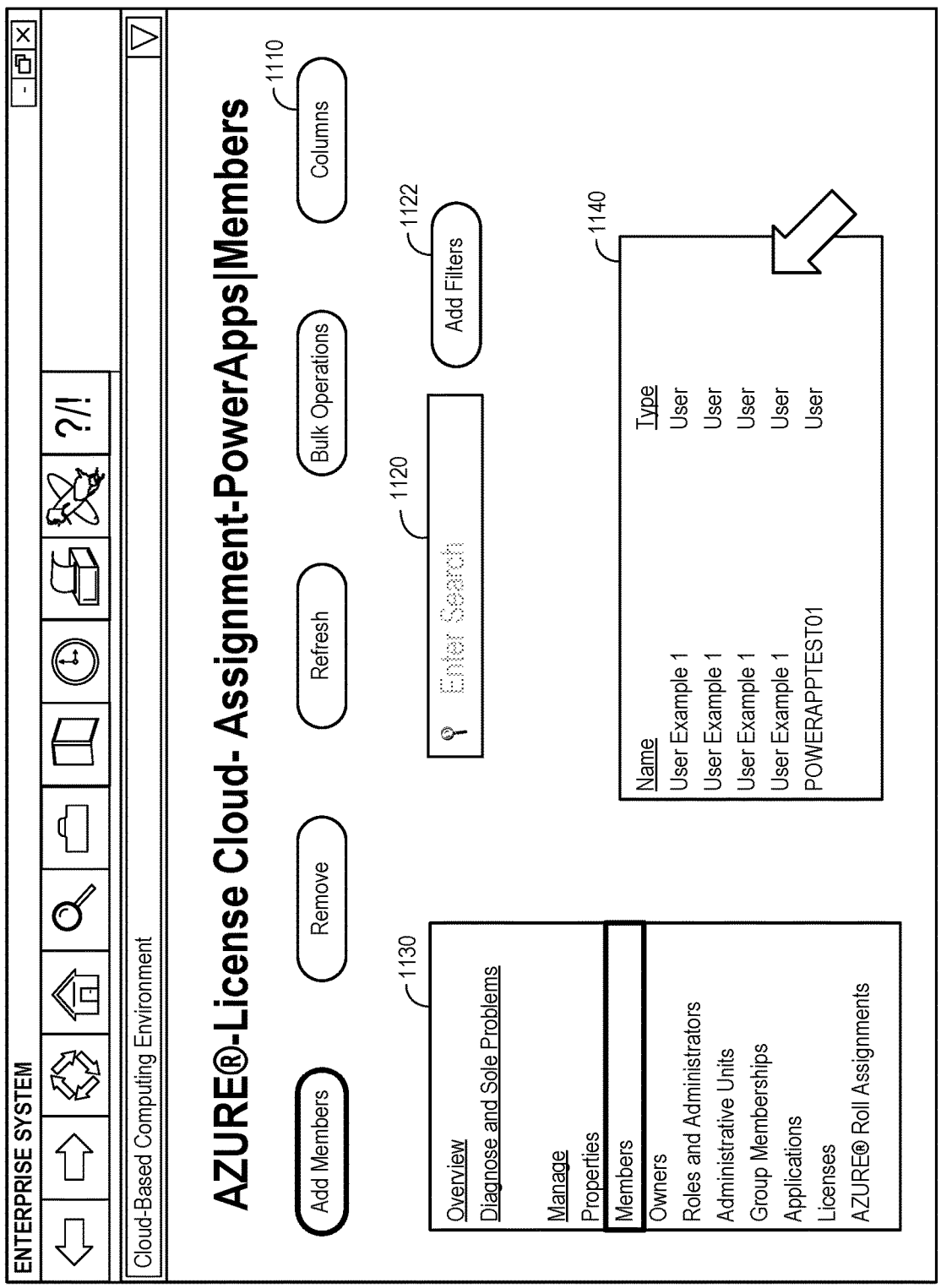
FIG. 11 is a license group member display in accordance with some embodiments.
Figure 12:
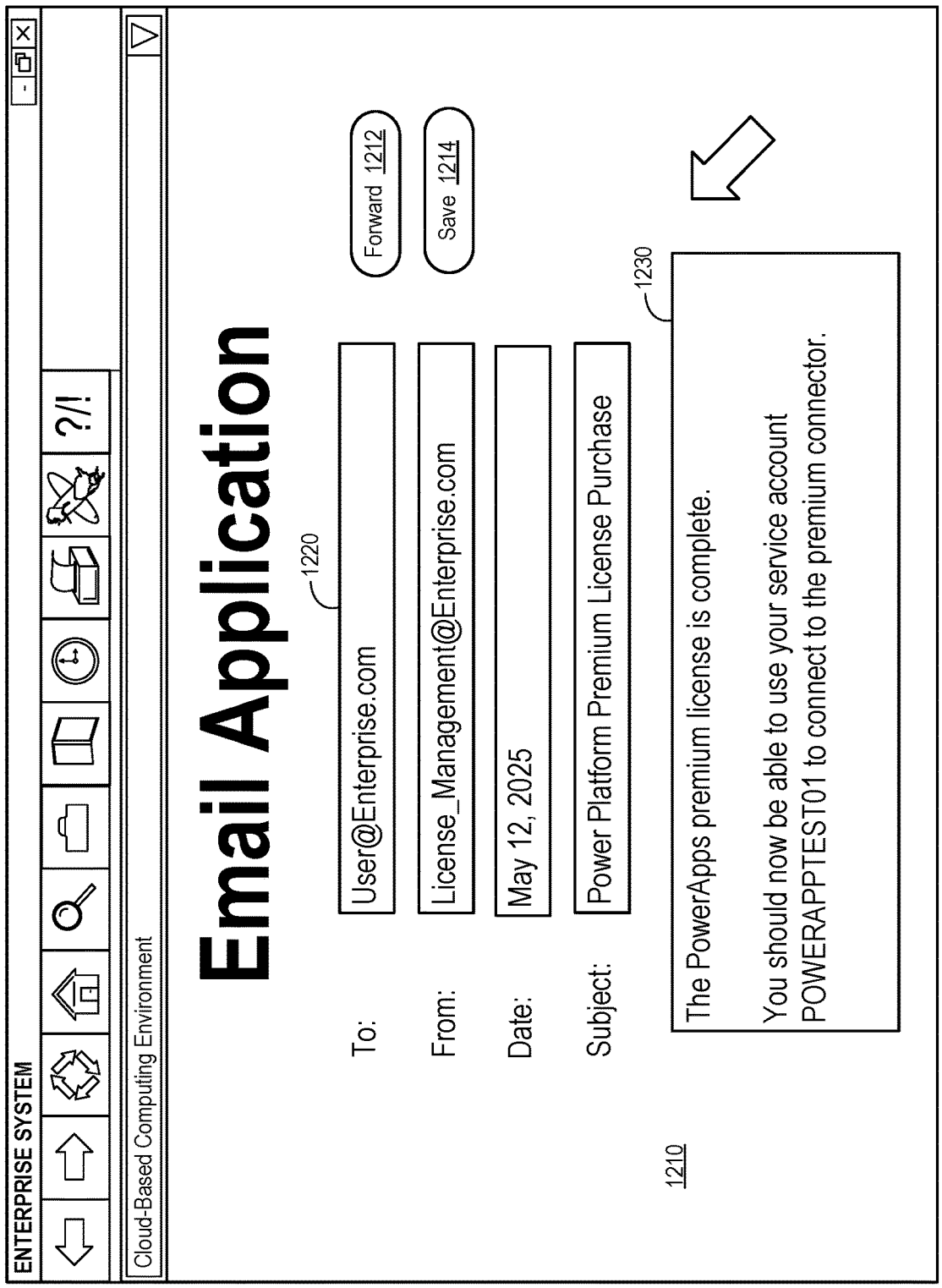
FIG. 12 is an automated email notification transmitted to a user according to some embodiments.

Once reserved, the service account may be added to the appropriate AZURE® group. For example, FIG. 11 is a license group member display 1100 in accordance with some embodiments. The display 1100 may be used to add members, remove members, refresh the system, perform bulk operation, arrange/add/delete columns 1110, etc. Moreover, the display 1100 lets a search be entered 1120 and/or filters be applied 1122 to results. A navigation pane 1130 may be used, for example, to view a list of members and a result area 1140 may be used to show that information on the display 1100. After the assignment is complete, FIG. 12 is an automated email application display 1200 showing an email notification 1210 that may be transmitted to a user according to some embodiments. The email notification 1210 might be forwarded 1212 to another party, saved 1214, exported, etc. As indicated by a header 1220, the email notification 1210 is transmitted to the user from an automated system with a subject and email body 1230 indicating that the requested functionality is now available.

Figure 13:
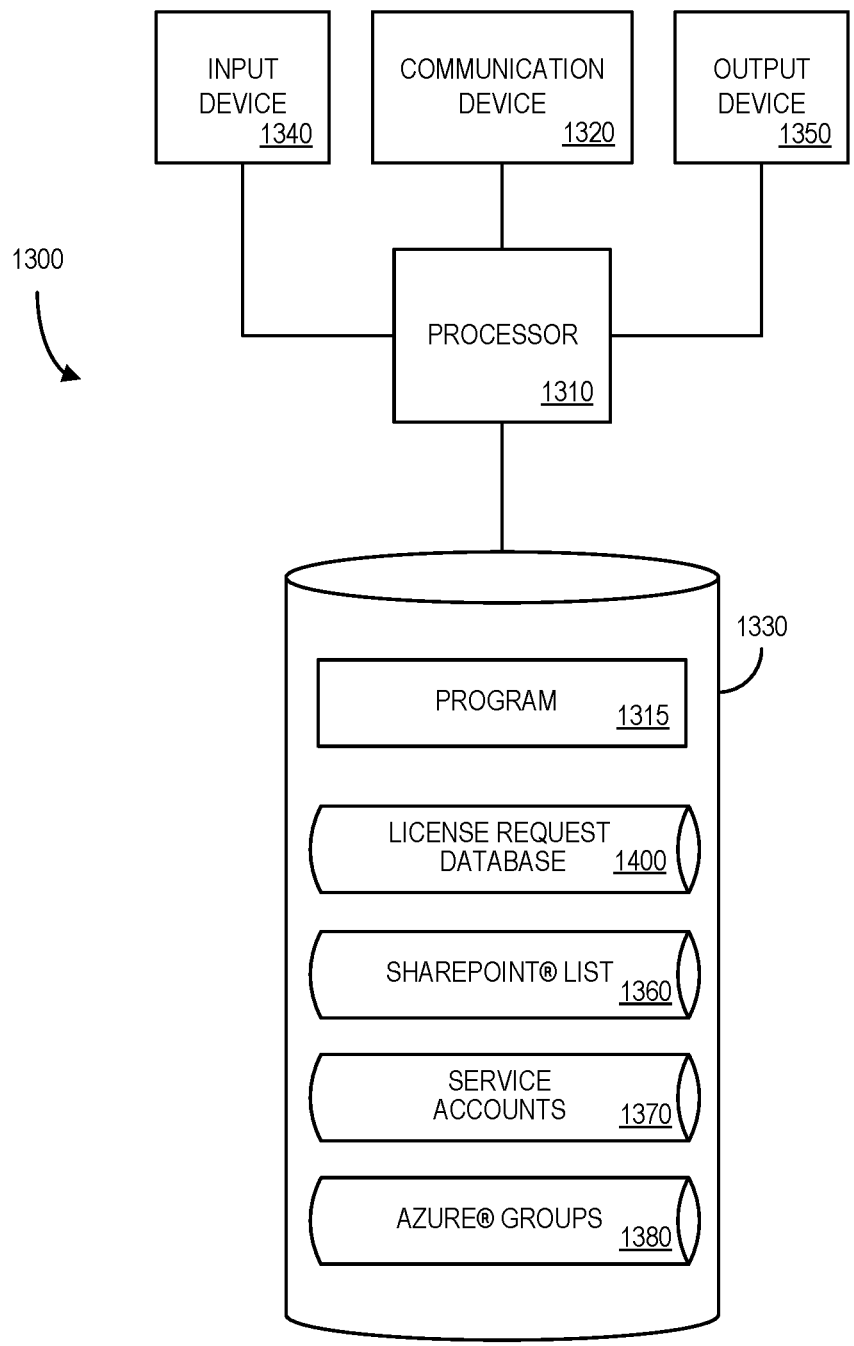
FIG. 13 is a block diagram of an apparatus in accordance with some embodiments.

The embodiments described herein may be implemented using any number of different hardware configurations. For example, FIG. 13 illustrates an apparatus 1300 that may be, for example, associated with the systems 100, 300 described with respect to FIGS. 1 and 3, respectively. The apparatus 1300 comprises a processor 1310, such as one or more commercially available Central Processing Units ("CPUs") in the form of one-chip microprocessors, coupled to a communication device 1320 configured to communicate via a communication network (not shown in FIG. 13). The communication device 1320 may be used to communicate, for example, with one or more remote third-party devices, underwriting platforms, web-based tools, administrators, insurance agents, and/or communication devices (e.g., PCs and smartphones). Note that communications exchanged via the communication device 1320 may utilize security features, such as those between a public internet user and an internal network of an insurance company and/or an enterprise. The security features might be associated with, for example, web servers, firewalls, and/or PCI infrastructure. The apparatus 1300 further includes an input device 1340 (e.g., a mouse and/or keyboard to enter information about authorization data sources, authorization management rules or preferences, business rules or logic, etc.) and an output device 1350 (e.g., to output reports regarding authorization management, machine learning algorithms, recommendations, alerts, etc.).

The processor 1310 also communicates with a storage device 1330. The storage device 1330 may comprise any appropriate information storage device, including combinations of magnetic storage devices (e.g., a hard disk drive), optical storage devices, mobile telephones, and/or semiconductor memory devices. The storage device 1330 stores a program 1315 and/or an authorization management tool or application for controlling the processor 1310. The processor 1310 performs instructions of the program 1315, and thereby operates in accordance with any of the embodiments described herein. For example, the processor 1310 may receive, from a user device, a request for third-party authorization to utilize functionality associated with the cloud-based computing environment (e.g., a software license). Based on the received request, the processor 1310 may determine if the request is approved. If the request is approved, the processor 1310 may automatically transmit information to a third-party authorization assignment platform. Upon confirmation from the authorization assignment platform, the processor 1310 may transmit a notification to the user device indicating that third-party authorization has been obtained. The third-party authorization assignment platform may, according to some embodiments, automatically arrange to obtain authorization for the requested functionality from the third-party.

The program 1315 may be stored in a compressed, uncompiled and/or encrypted format. The program 1315 may furthermore include other program elements, such as an operating system, a database management system, and/or device drivers used by the processor 1310 to interface with peripheral devices.

As used herein, information may be "received" by or "transmitted" to, for example: (i) the apparatus 1300 from another device; or (ii) a software application or module within the apparatus 1300 from another software application, module, or any other source.

In some embodiments (such as shown in FIG. 13), the storage device 1330 further includes a license request database 1400, a SHAREPOINT® list 1360, service accounts 1370, and AZURE® groups 1380. An example of a database that might be used in connection with the apparatus 1300 will now be described in detail with respect to FIG. 14. Note that the database described herein is only an example, and additional and/or different information may be stored therein. Moreover, various databases might be split or combined in accordance with any of the embodiments described herein. For example, the license request database 1400 and SHAREPOINT® list 1360 might be combined and/or linked to each other within the program 1315.

Figure 14:
FIG. 14 is a portion of a license request database according to some embodiments.

Referring to FIG. 14, a table is shown that represents the license request database 1400 that may be stored at the apparatus 1300 according to some embodiments. The table may include, for example, entries associated with request for license purchases that have been received from users in the enterprise. The table may also define fields 1402, 1404, 1406, 1408, 1410 for each of the entries. The fields 1402, 1404, 1406, 1408, 1410 may, according to some embodiments, specify: a license request identifier 1402, a service account 1404, a type 1406, a date and time 1408, and a status 1410. The license request database 1400 may be created and updated, for example, based on information electrically received from various enterprise users.

The license request identifier 1402 may be, for example, a unique alphanumeric code identifying a request for third-party authorization to utilize functionality associated with a cloud-based computing environment. The service account 1404 may indicate who submitted the request and the type 1406 might indicate what type of license is being sought. The date and time 1408 may indicate when the request was submitted, and the status 1410 might indicate, for example, that a license has been reserved, a purchase has been approved (or not approved), a decision is pending, etc.

Figure 15:
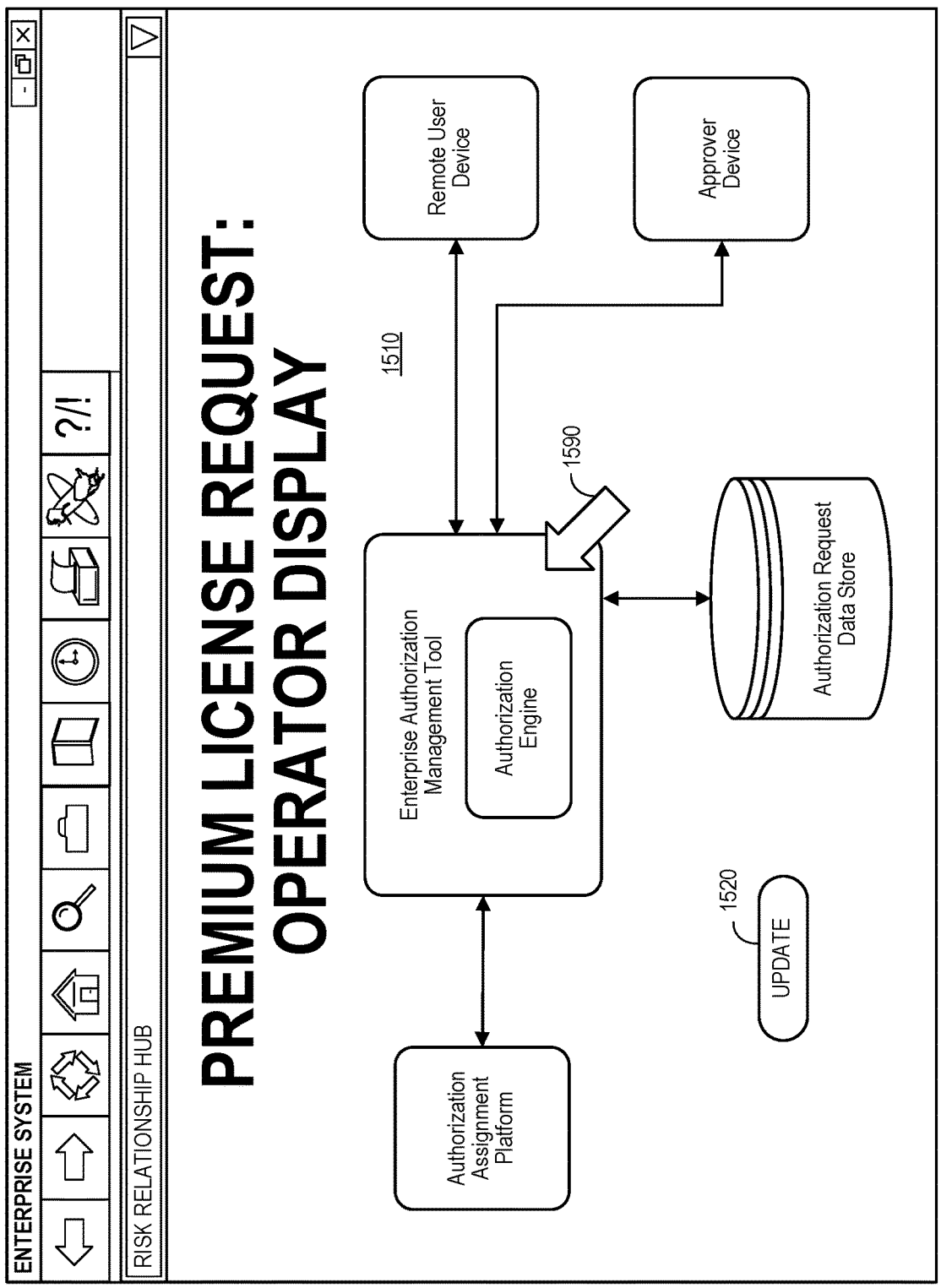
FIG. 15 is an operator or administrator display in accordance with some embodiments.

The operation of the authorization management tool may be controlled via a Graphical User Interface ("GUI"). For example, FIG. 15 is an authorization management operator or administrator display 1500 including graphical representations of elements of such a tool 1510 according to some embodiments. Selection of a portion or element of the display 1500 via a touchscreen or pointer 1590 might result in the presentation of additional information about that portion or element (e.g., a popup window presenting information about an authorization engine or authorization request data store in more detail) or let an operator or administrator enter or annotate additional information about approver device or assignor device mappings. An "Update" icon 1520 might initiate an authorization management process and/or save changes provided via the display 1500.

Thus, embodiments may provide improved systems and methods to accurately and/or automatically provide an enterprise authorization management tool for an enterprise. Moreover, the tool may be be easy to access, understand, interpret, update, etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to specific types of entities, embodiments may instead be associated with other types of businesses in additional to and/or instead of those described herein. Similarly, although certain types of license parameters were described in connection with some embodiments herein, other types of software/hardware licenses and/or parameters might be used instead.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed:

1. A system for an enterprise cloud-based computing environment, comprising:
   an enterprise authorization management tool, including:
      a computer processor, and
      a computer memory coupled to the computer processor and storing instructions that, when executed by the computer processor, cause the enterprise authorization management tool to:
         receive, from a user device, a request for third-party authorization to utilize functionality associated with the cloud-based computing environment, wherein the request includes all of: an enterprise justification, a desired outcome, an impact, an account identifier, and a product identifier,
         based on the received request, determine if the request is approved,
         if the request is approved, automatically transmit information to a third-party authorization assignment platform, and
         upon confirmation from the authorization assignment platform, transmit a notification to the user device indicating that third-party authorization has been obtained; and
      the third-party authorization assignment platform, coupled to the enterprise authorization management tool, to automatically arrange to obtain authorization for the requested functionality from the third-party.

2. The system of claim 1, wherein the functionality associated with the cloud-based computing environment is associated with at least one of: (i) a Software-as-a-Service ("SaaS"), (ii) an automation platform premium connection, (iii) a cloud application, and (iv) an on-premises application.

3. The system of claim 1, wherein the request for third-party authorization to utilize functionality is associated with a software license from the third-party.

4. The system of claim 1, wherein the enterprise authorization management tool is associated with an automation platform.

5. The system of claim 4, wherein the automation platform utilizes a web-based collaborative platform list.

6. The system of claim 1, wherein the third-party authorization assignment platform is associated with a cloud computing platform that provides access, management, and development of applications and services through a global data center.

7. The system of claim 6, wherein the cloud computing platform utilizes an active directory.

8. The system of claim 1, wherein the determination of whether the request is approved utilizes an automated process associated with at least one of: (i) business rules, (ii) enterprise logic, and (iii) machine learning.

9. The system of claim 1, wherein the system further implements at least one of: (i) data loss prevention, (ii) group ownership of authorizations, (iii) reconciliation of authorizations, and (iv) disablement of authorizations.

10. The system of claim 1, wherein the system further provides a dashboard user interface to facilitate automated future license forecasting.

11. A method for an enterprise cloud-based computing environment, comprising:

receiving, at a computer processor of an enterprise authorization management tool from a user device, a request for authorization to utilize functionality associated with the cloud-based computing environment, wherein the request includes all of: an enterprise justification, a desired outcome, an impact, an account identifier, and a product identifier;

based on the received request, determining if the request is approved;

if the request is approved, automatically transmitting information to a third-party authorization assignment platform; and upon confirmation from the authorization assignment platform, transmitting a notification to the user device to indicate that third-party authorization has been obtained, wherein the third-party authorization assignment platform automatically arranges to obtain authorization for the requested functionality from the third-party.

12. The method of claim 11, wherein the functionality associated with the cloud-based computing environment is associated with at least one of: (i) a Software-as-a-Service ("SaaS"), (ii) an automation platform premium connection, (iii) a cloud application, and (iv) an on-premises application.

13. The method of claim 11, wherein the request for third-party authorization to utilize functionality is associated with a software license from the third-party.

14. A non-transitory, computer-readable medium storing instructions, that, when executed by a processor, cause the processor to perform a method for an enterprise cloud-based computing environment, the method comprising:

receiving, at a computer processor of an enterprise authorization management tool from a user device, a request for authorization to utilize functionality associated with the cloud-based computing environment, wherein the request includes all of: an enterprise justification, a desired outcome, an impact, an account identifier, and a product identifier;

based on the received request, determining if the request is approved;

if the request is approved, automatically transmitting information to a third-party authorization assignment platform; and upon confirmation from the authorization assignment platform, transmitting a notification to the user device to indicate that third-party authorization has been obtained, wherein the third-party authorization assignment platform automatically arranges to obtain authorization for the requested functionality from the third-party.

15. The medium of claim 14, wherein the enterprise authorization management tool is associated with an automation platform.

16. The medium of claim 15, wherein the automation platform utilizes a web-based collaborative platform list.

17. The medium of claim 14, wherein the third-party authorization assignment platform is associated with a cloud computing platform that provides access, management, and development of applications and services through a global data center.

18. The medium of claim 17, wherein the cloud computing platform utilizes an active directory.

* * * * *